US011146823B2

(12) United States Patent
Ramasubramonian et al.

(10) Patent No.: US 11,146,823 B2
(45) Date of Patent: Oct. 12, 2021

(54) SIGNALLING CHROMA QUANTIZATION PARAMETER (QP) MAPPING TABLES

(71) Applicant: QUALCOMM Incorporated, San Diego, CA (US)

(72) Inventors: Adarsh Krishnan Ramasubramonian, Irvine, CA (US); Dmytro Rusanovskyy, San Diego, CA (US); Geert Van der Auwera, Del Mar, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/911,003

(22) Filed: Jun. 24, 2020

(65) Prior Publication Data
US 2020/0413101 A1 Dec. 31, 2020

Related U.S. Application Data

(60) Provisional application No. 62/909,626, filed on Oct. 2, 2019, provisional application No. 62/866,561, filed on Jun. 25, 2019.

(51) Int. Cl.
| | |
|---|---|
| *H04N 19/70* | (2014.01) |
| *H04N 19/176* | (2014.01) |
| *H04N 19/186* | (2014.01) |
| *H04N 19/126* | (2014.01) |

(52) U.S. Cl.
CPC ............ *H04N 19/70* (2014.11); *H04N 19/126* (2014.11); *H04N 19/176* (2014.11); *H04N 19/186* (2014.11)

(58) Field of Classification Search
CPC .... H04N 19/70; H04N 19/176; H04N 19/186; H04N 19/126; H04N 19/136
USPC ..................................................... 375/240.26
See application file for complete search history.

(56) References Cited

U.S. PATENT DOCUMENTS

| | | | |
|---|---|---|---|
| 9,451,287 B2 | 9/2016 | Chien et al. | |
| 10,298,929 B2 | 5/2019 | Tourapis et al. | |
| 10,491,898 B2 | 11/2019 | Sullivan et al. | |
| 2012/0328004 A1* | 12/2012 | Coban ................... | H04N 19/90 375/240.03 |
| 2016/0366422 A1* | 12/2016 | Yin ....................... | H04N 19/649 |

(Continued)

FOREIGN PATENT DOCUMENTS

FR WO-2019245797 A1 * 12/2019 ........... H04N 19/147

OTHER PUBLICATIONS

J. Thiesse, J. Jung and M. Antonini, "Rate Distortion Data Hiding of Motion Vector Competition Information in Chroma and Luma Samples for Video Compression," in IEEE Transactions on Circuits and Systems for Video Technology, vol. 21, No. 6, pp. 729-741, Jun. 2011, doi: 10.1109/TCSVT.2011.2130330. (Year: 2011).*

(Continued)

*Primary Examiner* — Marnie A Matt
(74) *Attorney, Agent, or Firm* — Qualcomm Incorporated

(57) ABSTRACT

A method of decoding video data includes receiving a first chroma quantization parameter (QP) mapping table in an encoded video bitstream, determining a first chroma QP value for a first chroma block of video data from a luma QP value and the first chroma QP mapping table, decoding the first chroma block of video data using the first chroma QP value.

30 Claims, 5 Drawing Sheets

(56) References Cited

U.S. PATENT DOCUMENTS

| | | | |
|---|---|---|---|
| 2018/0035015 | A1 | 2/2018 | Olivier et al. |
| 2018/0152699 | A1* | 5/2018 | Kumar .................. H04N 19/174 |
| 2018/0278967 | A1* | 9/2018 | Kerofsky ............. H04N 19/186 |
| 2019/0272643 | A1* | 9/2019 | Gadgil ....................... G06T 9/00 |
| 2019/0320174 | A1 | 10/2019 | Ramasubramonian et al. |
| 2020/0029078 | A1 | 1/2020 | Pu et al. |
| 2020/0404275 | A1* | 12/2020 | Hsiang .................. H04N 19/649 |

OTHER PUBLICATIONS

Bross et al., "Versatile Video Coding (Draft 5)", Joint Video Experts Team (JVET) of ITU-T SG 16 WP 3 and ISO/IEC14 UTC 1/5C 29/WG 11, 14th Meeting: Geneva, CH, Mar. 19-27, 2019, JVET-N1001-v8, 399 Pages, XP030212626, Retrieved from the Internet: URL: http://phenix.int-evry.fr/mpeg/doc_end_user/documents/126_Geneva/wg11/m48053JVET-N1001-v8-JVET-N1001-v8.zip. JVET-N1001-v8.docx. [retrieved on Jun. 11, 2019].

Chen J., et al., "Algorithm Description of Joint Exploration Test Model 1", 1, JVET Meeting, Oct. 19-21, 2015, Geneva, CH (The Joint Video Exploration Team of ISO/IEC JTC1/SC29/WG11 and ITU-T SG.16); Url: http://phenix.int-evry.fr/jvet/, No. JVET-A1001, Feb. 24, 2016 (Feb. 24, 2016), XP030150000, 27 Pages.

Ikonin (Huawei) S., et al., "AHG15: Signalling of Chroma QP Mapping Table", 15. JVET Meeting, Jul. 3, 2019-Jul. 12, 2019, Gothenburg, SE (The Joint Video Exploration Team of ISO/IEC JTC1/SC29/WG11 and ITU-T SG.16), No. JVET-O0186, Jun. 24, 2019 (Jun. 24, 2019), XP030218777, 9 Pages, Retrieved from the Internet: URL: http://phenix.int-evry.fr/jvet/doc_end_user/documents/15_Gothenburg/wg11/JVET-O0186-v1.zip JVET-O186.docx, [retrieved on Jun. 24, 2019].

International Search Report and Written Opinion—PCT/US2020/039626—ISAEPO—dated Aug. 17, 2020.

ITU-R Recommendation BT.2020-2, "Parameter Values for Ultra-High Definition Television Systems for Production and International Programme Exchange", Oct. 2015, 8 Pages.

ITU-R Recommendation BT.709-6, "Parameter Values for the HDTV Standards for Production and International Programme Exchange", Jun. 2015, 19 Pages.

ITU-T H.265, Series H: Audiovisual and Multimedia Systems, Infastructure of Audiovisual Services—Coding of Moving Video, High Efficiency Video Coding, The International Telecommunication Union, Jun. 2019, 696 Pages.

Lu T., et al., "Chroma Quantization Parameter QPC Table for HDR Signal", 126. MPEG Meeting, Mar. 19, 2019-Mar. 27, 2019, Geneva, CH (Motion Picture Expert Group or ISO/IEC JTC1/SC29/WG11), No. m46879, Mar. 21, 2019 (Mar. 21, 2019), XP030209780, 6 Pages, Retrieved from the Internet: URL: http://phenix.int-evry.fr/mpeg/doc_end_user/documents/126_Geneva/wg11/m46879-JVET-N0221-v2-JVET-N0221_HDR_QPc_v2.zip, JVET-N0221_HDR_.QPc_v2.docx, [retrieved on Mar. 21, 2019].

Ramasubramonian (Qualcomm) A K., et al., "AHG15: On Signalling of Chroma QP tables", 15. JVET Meeting, Jul. 3, 2019-Jul. 12, 2019, Gothenburg, SE (The Joint Video Exploration Team of ISO/IEC JTC1/SC29/WG11 and ITU-TSG.16), No. JVET-O0650, Jul. 12, 2019 (Jul. 12, 2019), XP030220166, 4 Pages, Retrieved from the Internet: URL http://phenix.int-evry.fr/jvet/doc_end_user/documents/15_Gothenburg/wg11/JVET-O0650-v4.zip JVET-O0650-v4.docx, [retrieved on Jul. 12, 2019].

SMPTE Standard for Motion-Picture Film {8-mm TypeR)—Camera Aperture Image and Usage, SMPTE 231-2004, Nov. 8, 2004, 4 pp.

SMPTE Standard, "High Dynamic Range Electro-Optical Transfer Function of Mastering Reference Displays", SMPTE ST 2084:2014, The Society of Motion Picture and Television Engineers, Aug. 16, 2014, XP055225088, pp. 1-14, ISBN: 978-1-61482-829-7.

* cited by examiner

SIGNALLING CHROMA QUANTIZATION PARAMETER (QP) MAPPING TABLES

This application claims the benefit of U.S. Provisional Application No. 62/866,561, filed Jun. 25, 2019, and U.S. Provisional Application No. 62/909,626, filed Oct. 2, 2019, both of which are hereby incorporated herein by reference in their entirety.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for determining quantization parameter (QP) values for chroma blocks of video data. In particular, this disclosure describes techniques that include signalling one or more chroma QP mapping tables in an encoded video bitstream. In one example, the chroma QP mapping tables may be signalled in a sequence parameter set (SPS). A video decoder may receive and decode the encoded chroma QP mapping tables and may then use the signalled chroma QP mapping tables to determine QP values for chroma components of blocks of video data from the chroma QP mapping table and a QP value used for a corresponding luma block. In some examples, a video encoder may encode and signal chroma QP mapping tables as a piece-wise linear model.

One benefit of signalling a chroma QP mapping table in the bitstream is to provide encoders the flexibility to efficiently model the chroma QP values for a particular type of video content without resorting to the use of QP offset values. Constraining the signalling of the chroma QP mapping table (e.g., using a static chroma QP mapping table) may defeat this purpose. As such, it is beneficial to have a more generic signalling mechanism for chroma QP mapping tables.

In one example, a method includes receiving syntax elements describing a set of pivot points that specify a piece-wise linear model for a first chroma quantization parameter (QP) mapping table in an encoded video bitstream, determining a first chroma QP value for a first chroma block of video data from a luma QP value and the first chroma QP mapping table, and decoding the first chroma block of video data using the first chroma QP value.

In another example, an apparatus includes a memory configured to store video data, and one or more processors in communication with the memory, the one or more processors configured to receive syntax elements describing a set of pivot points that specify a piece-wise linear model for a first chroma quantization parameter (QP) mapping table in an encoded video bitstream, determine a first chroma QP value for a first chroma block of video data from a luma QP value and the first chroma QP mapping table, and decode the first chroma block of video data using the first chroma QP value.

In another example, an apparatus includes means for receiving syntax elements describing a set of pivot points that specify a piece-wise linear model for a first chroma quantization parameter (QP) mapping table in an encoded video bitstream, means for determining a first chroma QP value for a first chroma block of video data from a luma QP value and the first chroma QP mapping table, means for decoding the first chroma block of video data using the first chroma QP value.

In another example, this disclosure describes a non-transitory computer-readable storage medium storing instructions that, when executed, cause one or more processors of a device configured to decode video data to receive syntax elements describing a set of pivot points that specify a piece-wise linear model for a first chroma quantization parameter (QP) mapping table in an encoded video bitstream, determine a first chroma QP value for a first chroma block of video data from a luma QP value and the first chroma QP mapping table, and decode the first chroma block of video data using the first chroma QP value.

In another example, a method includes determining a first chroma QP value for a first chroma block of video data from a luma QP value and a first chroma QP mapping table, encoding the first chroma block of video data using the first chroma QP value, and signalling syntax elements describing a set of pivot points that specify a piece-wise linear model for the first chroma quantization parameter (QP) mapping table in an encoded video bitstream.

In another example, an apparatus includes a memory configured to store video data, and one or more processors in communication with the memory, the one or more processors configured to determine a first chroma QP value for a first chroma block of video data from a luma QP value and a first chroma QP mapping table, encode the first chroma block of video data using the first chroma QP value, and signal syntax elements describing a set of pivot points that specify a piece-wise linear model for the first chroma quantization parameter (QP) mapping table in an encoded video bitstream.

In another example, an apparatus includes means for determining a first chroma QP value for a first chroma block of video data from a luma QP value and a first chroma QP mapping table, means for encoding the first chroma block of video data using the first chroma QP value, and means for signalling syntax elements describing a set of pivot points that specify a piece-wise linear model for the first chroma quantization parameter (QP) mapping table in an encoded video bitstream.

In another example, this disclosure describes a non-transitory computer-readable storage medium storing instructions that, when executed, cause one or more processors of a device configured to encode video data to determine a first chroma QP value for a first chroma block of video data from a luma QP value and a first chroma QP mapping table, encode the first chroma block of video data using the first chroma QP value, and signal syntax elements describing a set of pivot points that specify a piece-wise linear model for the first chroma quantization parameter (QP) mapping table in an encoded video bitstream.

The details of one or more examples are set forth in the accompanying drawings and the description below. Other features, objects, and advantages will be apparent from the description, drawings, and claims.

DETAILED DESCRIPTION

In example draft versions of the developing Versatile Video Coding (VVC) standard, the value of the quantization parameter (QP) used to decode chroma blocks (e.g., the chroma QP) is derived from the value of the QP used to decode luma blocks (e.g., the luma QP) and the value of offset parameters using a chroma QP mapping table (e.g., Table 8-15, in Bross, et al. "Versatile Video Coding (Draft 5)," Joint Video Experts Team (WET) of ITU-T SG 16 WP 3 and ISO/IEC JTC 1/SC 29/WG 11, 14$^{th}$ Meeting: Geneva, CH, 19-27 Mar. 2019, JVET-N1008-v8 (hereinafter "VVC Draft 5)). In some examples, the chroma QP mapping table has a linear slope of 1 for most QP values, and has a slope of less than 1 for QP values between 29 and 43. In VVC Draft 5, a fixed chroma QP mapping table is used to determine chroma QP values from luma QP values. That is, the chroma QP mapping table is not signalled in the bitstream, but rather is static and the same chroma QP mapping table is stored at both the video encoder and video decoder.

The techniques for determining chroma QP values using a static chroma QP mapping table (e.g., as in VVC Draft 5) exhibit several drawbacks. As one example, a static chroma QP mapping table does not provide the flexibility to model chroma QP values for all types of video content that may be encoded (e.g., high dynamic range (HDR) video content, wide color gamut (WCG) video content, natural content, screen content, etc.). As such, the use of a static chroma QP mapping table may result in sub-optimal distortion and/or coding efficiency in some situations. In addition, the chroma QP mapping table used in VVC Draft 5 is designed upon the assumption that the same table will be used for both Cb and Cr chroma components. However, in more general use cases (e.g., HDR video), it has been observed that it is advantageous to use different chroma QP mapping tables for Cb and Cr components.

In view of these drawbacks, this disclosure describes techniques for signalling one or more chroma QP mapping tables in an encoded video bitstream. In one example, the chroma QP mapping tables may be signalled in a sequence parameter set (SPS). A video decoder may receive and decode the encoded chroma QP mapping tables and may then use the signalled chroma QP mapping tables to determine QP values for chroma components of blocks of video data. In some examples, a video encoder may encode and signal chroma QP mapping tables as a piece-wise linear model.

One benefit of signalling a chroma QP mapping table in the bitstream is to provide encoders the flexibility to efficiently model the chroma QP values for a particular type of video content without resorting to the use of QP offset values. Constraining the signalling of the chroma QP mapping table (e.g., using a static chroma QP mapping table) may defeat this purpose. As such, it is beneficial to have a more generic signalling mechanism for chroma QP mapping tables.

Figure 1:
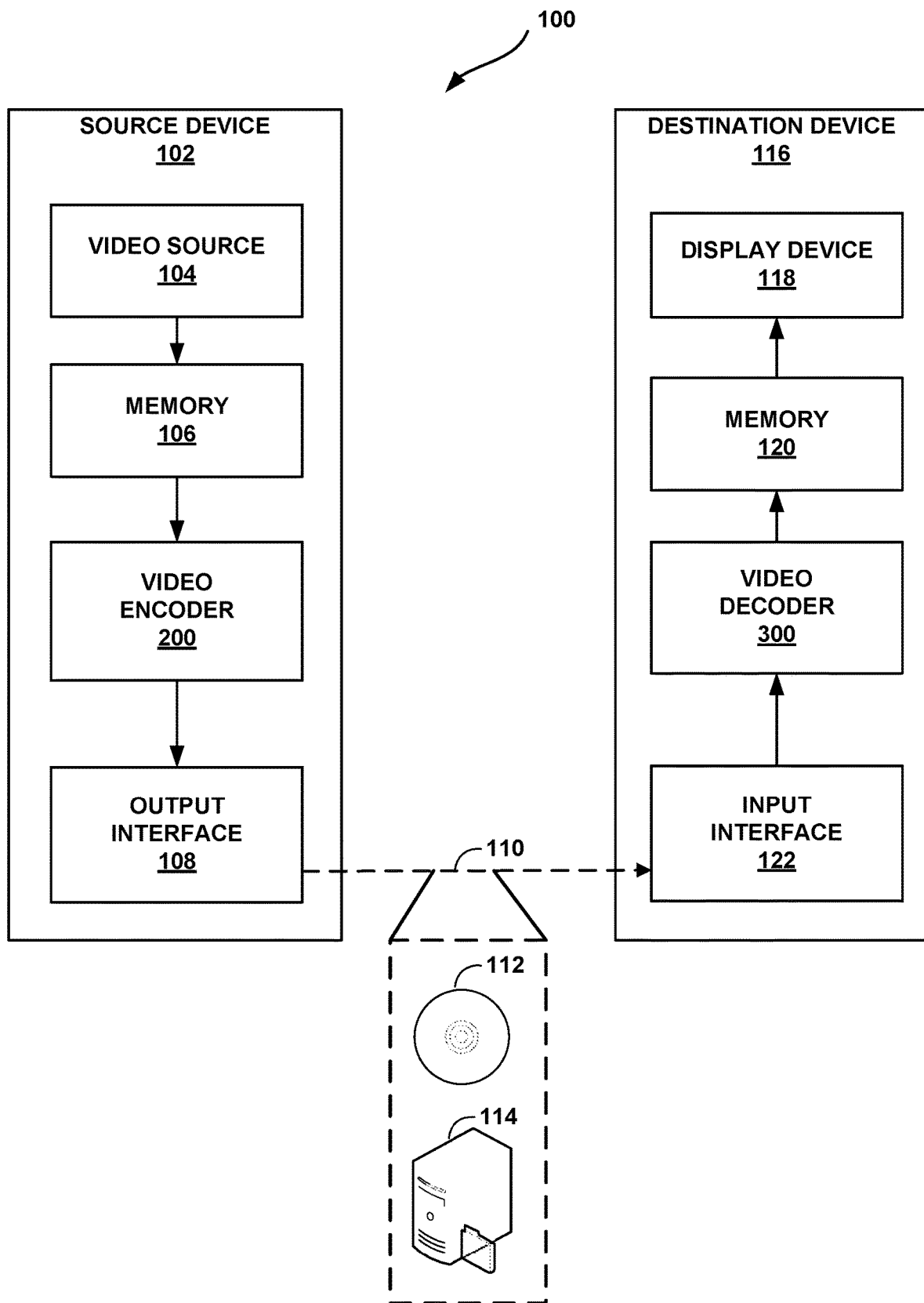
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signalling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for encoding and decoding chroma QP mapping tables. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for encoding and decoding chroma QP mapping tables. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may demodulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, computer-readable medium 110 may include storage device 112. Source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, computer-readable medium 110 may include file server 114 or another intermediate storage device that may store the encoded video data generated by source device 102. Source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signalling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC) and/or MPEG Essential Video Coding (EVC). A recent draft of the VVC standard is described in Bross, et al. "Versatile Video Coding (Draft 5)," Joint Video Experts Team (WET) of ITU-T SG 16 WP 3 and ISO/IEC JTC 1/SC 29/WG 11, 14$^{th}$ Meeting: Geneva, CH, 19-27 Mar. 2019, WET-N1008-v8 (hereinafter "VVC Draft 5). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures used in examples of VVC and/or EVC. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using an advanced motion vector prediction (AMVP) or merge mode. Video encoder 200 may use similar modes to encode motion vectors for an affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signalled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

As will be explained in more detail below, in accordance with the techniques of this disclosure, video encoder 200 may be configured to determine a first chroma QP value for a first chroma block of video data from a luma QP value and a first chroma QP mapping table, encode the first chroma block of video data using the first chroma QP value, and signal syntax elements describing a set of pivot points that specify a piece-wise linear model for the first chroma QP mapping table in an encoded video bitstream. Likewise, in a reciprocal fashion, video decoder 300 may be configured to receive syntax elements describing a set of pivot points that specify a piece-wise linear model for a first chroma QP mapping table in an encoded video bitstream, determine a first chroma QP value for a first chroma block of video data from a luma QP value and the first chroma QP mapping table, and decode the first chroma block of video data using the first chroma QP value.

This disclosure may generally refer to "signalling" certain information, such as syntax elements. The term "signalling" may generally refer to the communication of values for syntax elements and/or other data used to decode encoded video data. That is, video encoder 200 may signal values for syntax elements in the bitstream. In general, signalling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2:
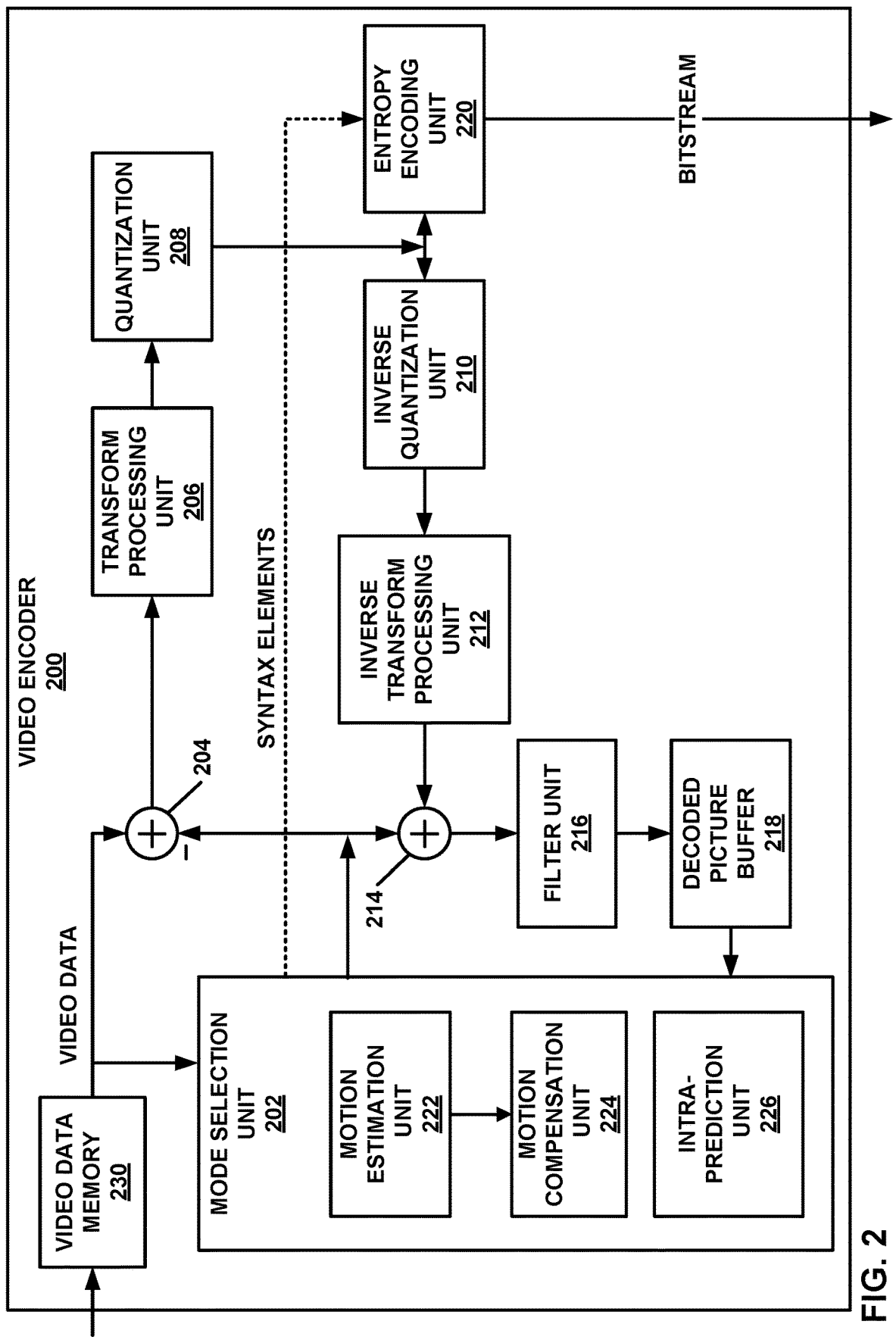
FIG. 2 is a block diagram illustrating an example video encoder that may perform the techniques of this disclosure.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 according to the techniques of VVC (ITU-T H.266, under development), EVC, and HEVC (ITU-T H.265). However, the techniques of this disclosure may be performed by video encoding devices that are configured to other video coding standards.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, of FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such an intra-block copy mode coding, affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

As will be explained in more detail below, in some examples of the disclosure, quantization unit 208 (or another structural unit of video encoder 200) may be configured to signal one or more chroma QP mapping tables in an encoded video bitstream. Quantization unit 208 may use the chroma QP mapping table to determine a QP value for a chroma block of video data from the QP value used to encode a corresponding luma block of video data (e.g., a luma QP value). That is, the luma QP value is the input to the chroma QP mapping table. The chroma QP mapping table outputs a chroma QP value as a function of the luma QP value. In some examples, the function is a piece-wise linear value. Quantization unit 208 may signal the chroma QP mapping table used (e.g., in an SPS) to video decoder 300. Video decoder 300 may then use the chroma QP mapping table to determine a chroma QP value that may be used to perform inverse quantization when decoding the chroma block of video data.

In one example of the disclosure, quantization unit 208 (or another structural unit of video encoder 200) may be configured to determine a first chroma QP value for a first chroma block of video data from a luma QP value and a first chroma QP mapping table, encode the first chroma block of video data using the first chroma QP value, and signal the first chroma QP mapping table in an encoded video bitstream. In one example, the first chroma QP mapping table is a piece-wise linear model. In this example, to signal the first chroma QP mapping table, quantization unit 208 may be configured to signal syntax elements describing a set of pivot points that specify the piece-wise linear model.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in a bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying an MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to determine a first chroma QP value for a first chroma block of video data from a luma QP value and a first chroma QP mapping table, encode the first chroma block of video data using the first chroma QP value, and signal syntax elements describing a set of pivot points that specify a piece-wise linear model for the first chroma QP mapping table in an encoded video bitstream.

Figure 3:
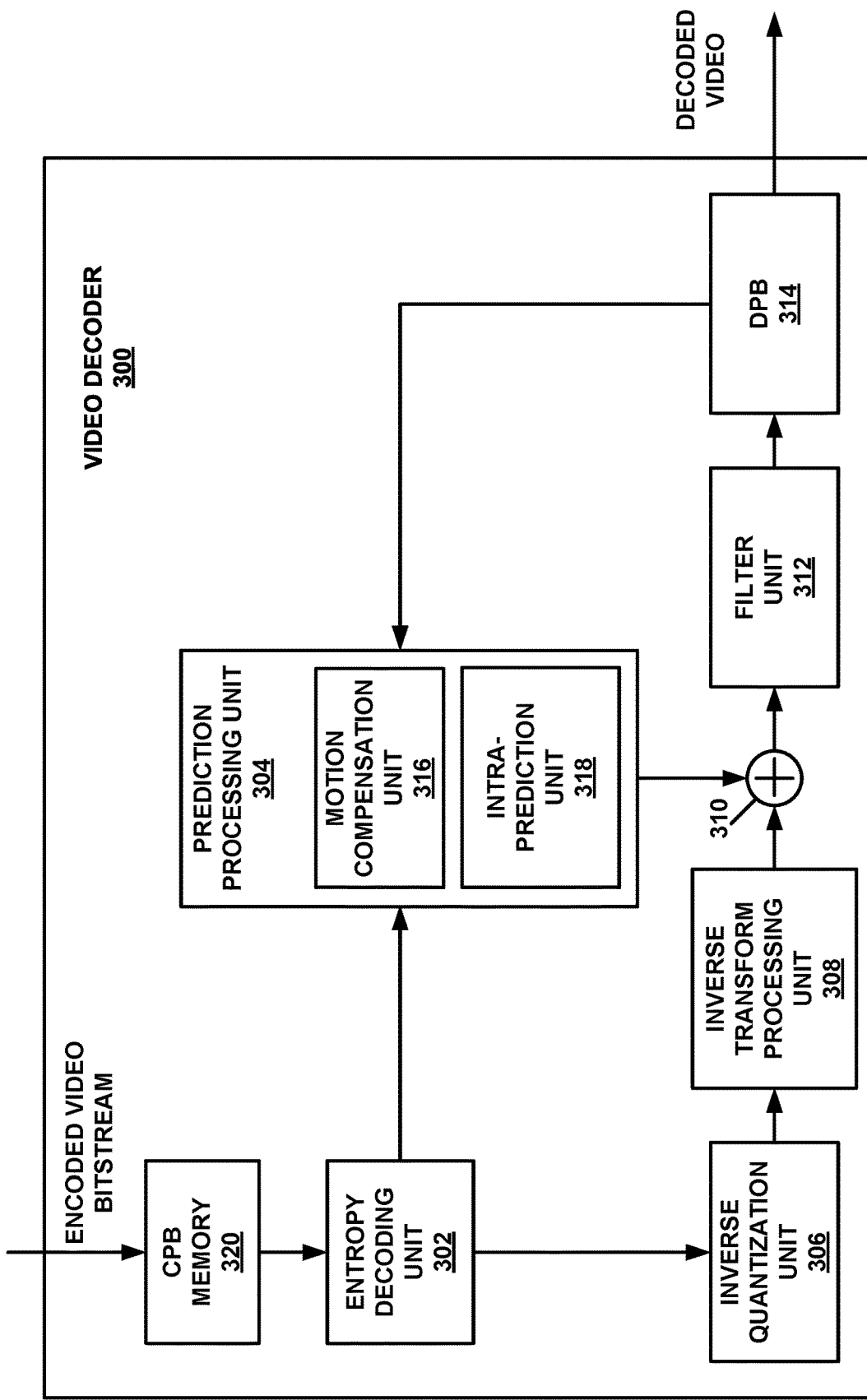
FIG. 3 is a block diagram illustrating an example video decoder that may perform the techniques of this disclosure.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of VVC (ITU-T H.266, under development), EVC, and HEVC (ITU-T H.265). However, the techniques of this disclosure may be performed by video coding devices that are configured to other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

As will be explained in more detail below, in some examples of the disclosure, inverse quantization unit 306 (or another structural unit of video decoder 300) may be configured to receive one or more chroma QP mapping tables in an encoded video bitstream. Inverse quantization unit 306 may use the chroma QP mapping table to determine a QP value (e.g., a chroma QP value) for a chroma block of video data from the QP value used to decode a corresponding luma block of video data (e.g., a luma QP value). That is, the luma QP value is the input to the chroma QP mapping table. The chroma QP mapping table outputs the chroma QP value as a function of the luma QP value. In some examples, the function is a piece-wise linear value. Inverse quantization unit 306 may receive the chroma QP mapping table used (e.g., in an SPS). Inverse quantization unit 306 of video decoder 300 may then use the chroma QP mapping table to determine a chroma QP value that may be used to perform inverse quantization when decoding the chroma block of video data.

In one example of the disclosure, inverse quantization unit 306 (or another structural unit of video decoder 300) may be configured to receive a first chroma QP mapping table in an encoded video bitstream, determine a first chroma QP value for a first chroma block of video data from a luma QP value and the first chroma QP mapping table, and decode the first chroma block of video data using the first chroma QP value. In one example, the first chroma QP mapping table is a piece-wise linear model. In this example, to receive the first chroma QP mapping table, inverse quantization unit 306 may be configured to receive syntax elements describing a set of pivot points that specify the piece-wise linear model.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 2).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 2). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to receive syntax elements describing a set of pivot points that specify a piece-wise linear model for a first chroma QP mapping table in an encoded video bitstream, determine a first chroma QP value for a first chroma block of video data from a luma QP value and the first chroma QP mapping table, and decode the first chroma block of video data using the first chroma QP value.

Next generation video applications are anticipated to operate with video data representing captured scenery with high dynamic range (HDR) and/or a wide color gamut (WCG). Parameters of the utilized dynamic range and color gamut are two independent attributes of video content, and their specification for purposes of digital television and multimedia services are defined by several international standards. For example, ITU-R Rec. BT.709, "Parameter values for the HDTV standards for production and international programme exchange," and ITU-R Rec. BT.2020, "Parameter values for ultra-high definition television systems for production and international programme exchange," define parameters for HDTV (high definition television) and UHDTV (ultra-high definition television), respectively, such as standard dynamic range (SDR) and color primaries that extend beyond the standard color gamut. Rec. BT.2100, "Image parameter values for high dynamic range television for use in production and international programme exchange" defines transfer functions and representations for HDR television use, including primaries that support wide color gamut representations.

There are also other standards developing organization (SDOs) documents that specify dynamic range and color gamut attributes in other systems, e.g., DCI-P3 color gamut is defined in SMPTE-231-2 (Society of Motion Picture and Television Engineers) and some parameters of HDR are defined in SMPTE-2084. A brief description of dynamic range and color gamut for video data is provided below.

Dynamic range is typically defined as the ratio between the maximum and minimum brightness (e.g., luminance) of the video signal. Dynamic range may also be measured in terms of 'f-stop,' where one f-stop corresponds to a doubling of a signal's dynamic range. As defined by the Motion Picture Expert Group (MPEG), content that features brightness variation with more than 16 f-stops is referred as HDR content. In some terms, levels between 10 and 16 f-stops are considered as intermediate dynamic range but may be considered to be HDR according to other definitions. In some examples of this disclosure, HDR video content may be any video content that has a higher dynamic range than traditionally used video content with a standard dynamic range (e.g., video content as specified by ITU-R Rec. BT.709).

The human visual system (HVS) is capable for perceiving much larger dynamic ranges than SDR content and HDR content. However, the HVS includes an adaptation mechanism to narrow the dynamic range of the HVS to a so-called simultaneous range. The width of the simultaneous range may be dependent on current lighting conditions (e.g., current brightness).

Current video applications and services are regulated by ITU Rec. 709 and provide for SDR, typically supporting a range of brightness (e.g., luminance) of around 0.1 to 100 candelas (cd) per m2 (often referred to as "nits"), leading to less than 10 f-stops. Some example next generation video services are expected to provide dynamic range of up to 16 f-stops. Although detailed specifications for such content are currently under development, some initial parameters have been specified in SMPTE-2084 and ITU-R Rec. 2020.

Chroma QP Dependency on the Luma QP Value

Some state-of-the-art video coding designs, such as HEVC and newer video coding standards, may utilize a pre-defined dependency between luma and chroma QP values (e.g., a static chroma QP mapping table) that is effectively applied to process a currently coded Cb chroma block and/or a currently coded Cr chroma block. Such a dependency may be utilized to achieve an optimal bitrate allocation between luma and chroma components.

An example of such a dependency is represented by Table 8-10 of the HEVC specification, where chroma QP values applied for decoding chroma samples are derived from QP values utilized for decoding luma samples. The relevant sections of HEVC where the chroma QP value is derived based on the QP value of the corresponding luma sample (e.g., the QP value applied to the block/TU of the corresponding luma sample), chroma QP offsets, and Table 8-10 of HEVC specification are reproduced below.

When ChromaArrayType is not equal to 0, the following applies:

The variables $qP_{Cb}$ and $qP_{Cr}$ are derived as follows:
If tu_residual_act_flag[xTbY][yTbY] is equal to 0, the following applies:

---

$qPi_{Cb}$ = Clip3( $-QpBdOffset_C$, 57, $Qp_Y$ + pps_cb_qp_offset + slice_cb_qp_offset + $CuQpOffse_{Cb}$ ) (8-287)

$qPi_{Cr}$ = Clip3( $-QpBdOffset_C$, 57, $Qp_Y$ + pps_cr_qp_offset + slice_cr_qp_offset + $CuQpOffset_{Cr}$ ) (8-288)

– Otherwise (tu_residual_act_flag[ xTbY ][ yTbY ] is equal to 1), the following applies:

$qPi_{Cb}$ = Clip3( –QpBdOffsetC, 57, QpY + PpsActQpOffsetCb + slice_act_cb_qp_offset +
    CuQpOffsetCb ) (8-289)

$qPi_{Cr}$ = Clip3( –QpBdOffsetC, 57, QpY + PpsActQpOffsetCr + slice_act_cr_qp_offset +
    CuQpOffsetCr ) (8-290)

---

If ChromaArrayType is equal to 1, the variables $qP_{Cb}$ and $qP_{Cr}$ are set equal to the value of Qpc as specified in Table 8-10 based on the index qPi equal to $qPi_{Cb}$ and $qPi_{Cr}$, respectively.

Otherwise, the variables $qP_{Cb}$ and $qP_{Cr}$ are set equal to Min(qPi, 51), based on the index qPi equal to $qPi_{Cb}$ and $qPi_{Cr}$, respectively.

The chroma quantization parameters for the Cb and Cr components, $Qp'_{Cb}$ and $Qp'_{Cr}$, are derived as follows:

$Qp'_{Cb} = qP_{Cb} + QpBdOffset_C$ (8-291)

$Qp'_{Cr} = qP_{Cr} + QpBdOffset_C$ (8-292)

TABLE 8-10

Specification of Qpc as a function of qPi for ChromaArrayType equal to 1

| qPi | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| Qpc | = qPi | 29 | 30 | 31 | 32 | 33 | 33 | 34 | 34 | 35 | 35 | 36 | 36 | 37 | 37 | = qPi − 6 |

The variables $qP_{Cb}$ and $qP_{Cr}$ are intermediate values of the Cb and Cr chroma QPs respectively, that are used to determine the final QP values $Qp'_{Cb}$ and $Qp'_{Cr}$. ChromaArrayType being zero indicates that monochrome coding syntax is used. ChromaArrayType being not zero (e.g., greater than zero) indicates different types of chroma sub-sampling formats (e.g., 4:4:4, 4:2:2, 4:2:0, etc.).

Similar QP mapping tables and chroma QP derivation are used in VVC (e.g., Table 8-15 in VVC Draft 5).

In VVC Draft 5, the chroma QP value is derived from a luma QP value and offset parameters using the chroma QP mapping table (e.g., Table 8-15 in VVC Draft 5). The chroma QP mapping table has a linear slope of 1 for most of the luma QP values. For luma QP values between 29 and 43, the slope is less than 1.

The design of VVC Draft 5 and other techniques that use static chroma QP mapping tables, with or without chroma QP offsets, have several drawbacks. As one example, a static chroma QP mapping table does not provide the flexibility to model chroma QP values for all types of video content that may be encoded (e.g., high dynamic range (HDR) video content, wide color gamut (WCG) video content, natural content, screen content, etc.). As such, the use of a static chroma QP mapping table may result in sub-optimal distortion and/or coding efficiency in some situations.

In addition, the chroma QP mapping table used in VVC Draft 5 is designed upon the assumption that the same table will be used for both Cb and Cr chroma components. However, in more general use cases (e.g., HDR video), it has been observed that it is advantageous to use different chroma QP mapping tables for Cb and Cr components.

In view of the foregoing, this disclosure describes techniques for signalling one or more chroma QP mapping tables in an encoded video bitstream. In one example, the chroma QP mapping tables may be signalled in a sequence parameter set (SPS). Video decoder 300 may receive and decode the encoded chroma QP mapping tables and may then use the signalled chroma QP mapping tables to determine QP values for chroma components of blocks of video data. In some examples, video encoder 200 may encode and signal chroma QP mapping tables as a piece-wise linear model.

One benefit of signalling chroma QP mapping table in the bitstream is to provide encoders the flexibility to efficiently model the chroma QP values for a particular type of video content (e.g., HDR content) without resorting to the use of QP offset values. Constraining the signalling of the chroma QP mapping table (e.g., using a static chroma QP mapping table) may defeat this purpose. As such, it is beneficial to have a more generic signalling mechanism for chroma QP mapping tables. The techniques of this disclosure may improve dynamic range adaptation for different types of video content. It is to be understood that one or more of the techniques described below may be used independently, or in combination with any other combination of techniques of the disclosure.

In one example of the disclosure, video encoder 200 and video decoder 300 may be configured to code (e.g., encode and decode, respectively) a syntax element that indicates whether one or more chroma QP mapping tables are signalled explicitly in the encoded video bitstream. For example, video encoder 200 may encode a syntax element having a first value (e.g., 1) that indicates chroma QP mapping tables are signalled in the bitstream or that has a second value (e.g., 0) that indicates chroma QP mapping tables are not signaled in the bitstream. Video encoder 200 may signal such syntax elements in one or more of a sequence parameter set (SPS), picture parameter set (PPS), adaptation parameter set (APS), other parameter sets, a picture header, a tile group header, a slice header, and/or other data structures for signaling syntax elements. If video encoder 200 signals the syntax element indicating that chroma QP mapping tables are signaled in the bitstream, video encoder 200 may further encode and signal such chroma QP mapping tables.

As one example, video encoder 200 may be configured to encode a chroma_qp_table_present_flag in an APS and/or an SPS that indicates whether or not chroma QP mapping tables are signaled in the bitstream. As one example, the chroma_qp_table_present_flag having a value equal to 1 specifies that chroma QP mapping tables are signalled in the APS. The chroma_qp_table_present_flag having a value equal to 0 specifies that chroma QP mapping tables are not signalled in the APS and that a default chroma QP mapping table (e.g., Table 8-15 in VVC Draft 5) is used for deriving the chroma QP values.

Video decoder 300 may be configured to receive and decode the syntax element indicating if chroma QP mapping tables are signaled in the bitstream. If video decoder 300 determines that the syntax element indicates that chroma QP mapping tables are signaled in the bitstream, video decoder 300 may also receive and decode such chroma QP mapping tables. If video decoder 300 determines that the syntax element indicates that chroma QP mapping tables are not signaled in the bitstream, video decoder 300 may instead use default chroma QP mapping tables (e.g., Table 8-15 in VVC Draft 5) and/or previously-received chroma QP mapping tables.

Accordingly, in one example of the disclosure, video encoder 200 may be configured to signal a syntax element that indicates whether one or more chroma QP mapping tables are signaled explicitly in the encoded video bitstream. Likewise, in a reciprocal fashion, video decoder 300 may be configured to receive a syntax element that indicates whether one or more chroma QP mapping tables are signaled explicitly in the encoded video bitstream. Based on this syntax element, video decoder 300 may be configured to determine whether chroma QP mapping tables are to be received and decoded.

In another example of the disclosure, video encoder 200 may signal one or more chroma QP mapping tables in the encoded video bitstream. Video encoder 200 may be configured to signal the chroma QP mapping tables regardless of whether or not video encoder 200 is configured to signal a syntax element that indicates that chroma QP mapping tables are signaled in the bitstream. That is, in some examples, video encoder 200 may not indicate whether or not chroma QP mapping tables are signaled. Rather, video encoder 200 may always signal the chroma QP mapping tables at some level of syntax structure (e.g., an SPS, APS, etc.).

Accordingly, in one example of the disclosure, video encoder 200 may be configured to determine a first chroma QP value for a first chroma block of video data from a luma QP value and a first chroma QP mapping table. Video encoder 200 may encode the first chroma block of video data using the first chroma QP value, and signal syntax elements describing a set of pivot points that specify a piece-wise linear model for the first chroma QP mapping table in an encoded video bitstream. In a reciprocal fashion, video decoder 300 may receive syntax elements describing a set of pivot points that specify a piece-wise linear model for a first chroma QP mapping table in an encoded video bitstream, determine a first chroma QP value for a first chroma block of video data from a luma QP value and the first chroma QP mapping table, and decode the first chroma block of video data using the first chroma QP value.

In the above example, video encoder 200 signals at least one chroma QP mapping table in a particular syntax structure (e.g., SPS, APS, etc.). In other examples, video encoder 200 may signal multiple chroma QP mapping tables for the particular syntax structure (e.g., one chroma QP mapping table for each of a plurality of APSs) and then signal an index that indicates which of the multiple chroma QP mapping tables are to be used for a block/tile/slice/picture (e.g., an ID to a particular APS). For example, as will be shown in Implementation Example 1 below, video encoder 200 may signal chromaQP_table_data in each of a plurality of APSs, where chromaQP_table_data specifies the chroma QP mapping table. Video encoder 200 may then signal an adaptation_parameter_set_id that is an ID that indicates the APS from which to obtain the chroma QP mapping table.

In one example of the disclosure, video encoder 200 may signal a chroma QP mapping table as a parametric function. In particular, video encoder 200 may signal the parameters of the parametric function. Video decoder 300 may receive the parameters and reconstruct the parametric function of the chroma QP mapping table.

In another example, video encoder 200 may signal the chroma QP mapping table as a piece-wise linear model. In some examples, video encoder 200 may signal the piece-wise linear model by signalling scales and offsets associated with each linear piece of the piece-wise linear model. In other examples, video encoder 200 may signal a set of pivot points specifying the boundaries of the piece-wise linear model. However, any technique for signaling the piece-wise linear model may be used. In the context of this disclosure, the boundaries of the piece-wise linear model indicate the positions of the model at which the slope of the linear model changes. As such, the pivot point is the position of the slope change (e.g., the boundary).

As is shown below in Implementation Example 1 and Implementation Example 2, video encoder 200 signals the chroma QP mapping table by signaling the pivot points specifying the boundaries of the piece-wise linear model. For example, video encoder 200 may signal a syntax element num_points_in_qp_table[i] which indicates the number of pivot points in the i-th chroma QP mapping table. Then, for each pivot point, video encoder 200 may signal a delta_qp_in_val[i][j] and delta_qp_out_val[i][j], where the delta_qp_in_val[i][j] specifies a delta value used to derive the input coordinate of the j-th pivot point of the i-th chroma QP mapping table, and delta_qp_out_val[i][j] specifies a delta value used to derive the output coordinate of the j-th pivot point of the i-th chroma QP mapping table.

Accordingly, in one example, video encoder 200 may be configured to signal a set of pivot points that specify the boundaries of the piece-wise linear model of a chroma QP mapping table. Video decoder 300 may be configured to receive a set of pivot point(s) that specify boundaries of the piece-wise linear model. Video decoder 300 may then reconstruct the chroma QP mapping table from the received pivot point(s).

In another example of the disclosure, video encoder 200 may signal a syntax element to indicate that the same chroma QP mapping table is used for Cb and Cr components. That is, the same chroma QP mapping table may be used for determining chroma QP values for co-located Cb chroma blocks and Cr chroma blocks. For example, when the syntax element has a value of 1, one chroma QP mapping table is used for both Cb and Cr chroma blocks. When the syntax element is 0, video encoder 200 may be configured to signal separate chroma QP mapping tables for Cb and Cr chroma blocks.

Likewise, in another example, video encoder 200 may signal a syntax element to indicate that the same chroma QP mapping table is used for Cb components, Cr components, and/or joint CbCr residuals. That is, the same chroma QP mapping table may be used for determining chroma QP values for co-located Cb chroma blocks, Cr chroma blocks, and/or joint CbCr residuals. For example, when the syntax element has a value of 1, one chroma QP mapping table is used for any of Cb chroma blocks, Cr chroma blocks, and/or joint CbCr residuals. When the syntax element is 0, video encoder 200 may be configured to signal separate chroma QP mapping tables for Cb chroma blocks, Cr chroma blocks, and/or joint CbCr residuals.

In one example of the disclosure, a first chroma block is a Cb chroma block and a second chroma block is a Cr chroma block that is co-located with the first chroma block. In this example, video encoder 200 may signal, and video decoder 300 may receive, a syntax element that indicates if the same chroma QP mapping table is used for both the Cb chroma block and the Cr chroma block.

In one example, the syntax element indicates that the same chroma QP mapping table is used for both the Cb chroma block and the Cr chroma block. In this example, video encoder 200 may signal a single chroma QP mapping table. Video decoder 300 may determine a first chroma QP value for the first chroma block (e.g., Cr block) and may determine a second chroma QP value for the second chroma block (e.g., the co-located Cb block) from a corresponding luma QP value and the chroma QP mapping table.

In another example, the syntax element indicates that the same chroma QP mapping table is not used for both the Cb chroma block and the Cr chroma block. In this example, video decoder 300 may receive a first chroma QP mapping table in the encoded video bitstream for the first chroma block (e.g., the Cb block) and may receive a second chroma QP mapping table in the encoded video bitstream for the second chroma block (e.g., the Cr block). Video decoder 300 may then determine a first chroma QP value for the Cb chroma block of video data from the luma QP value and the first chroma QP mapping table, and determine a second chroma QP value for the Cr chroma block of video data from the luma QP value and the second chroma QP mapping table.

In some example video codecs, in addition to Cb and Cr residuals (e.g., one residual block for a Cb component and another residual block for a Cr component), video encoder 200 and video decoder 300 may be configured to derive one or more residual blocks of video data from jointly coded and quantized Cb and Cr residuals. Such residuals may be referred to as joint CbCr residuals. For example, one joint residual may be obtained by averaging the residual of a Cb block (Cb_res) and the residual of a Cr block (Cr_res) using the equation (Cb_res+Cr_res)/2. In another example, the joint residual may be obtained from the averaged difference between the residual of the Cb block and the residual of the Cr block using the equation (Cb_res-Cr_res)/2. In such video codecs, video encoder 200 may be configured to define and signal a chroma QP mapping table for each such joint residual. In some examples, a chroma QP mapping table may be signalled for all the joint CbCr residuals.

In some examples, video encoder 200 may be configured to signal/specify that one or more chroma QP mapping tables for the Cb and/or Cr blocks may be applied to one or more joint residuals.

In some examples, video encoder 200 may be configured to signal a syntax element (e.g., an index value) that specifies which residual blocks (Cb, Cr, joint CbCr, etc.) share one or more chroma QP mapping tables. For example, when the index value is equal to 0, no residuals share the same chroma QP mapping table. When the index value is equal to 1, Cb and Cr blocks share the same chroma QP mapping table, whereas the joint CbCr residual block may be decoded using a separate chroma QP mapping table.

In one or more examples of the disclosure, one possible candidate for use as a chroma QP mapping table is the chroma QP mapping table that is defined by default in a video coding specification (e.g., a default chroma QP mapping table). In this example, video encoder 200 may be configured to signal a syntax element to indicate that for a particular residual type (e.g., Cb, Cr, joint CbCr), the default chroma QP mapping table is to be used or an explicitly signalled chroma QP mapping table is to be used.

In some examples, video encoder 200 may be configured to signal an N number of chroma QP mapping tables. For example, video encoder 200 may be configured to signal a list of N chroma QP mapping tables. Each chroma QP mapping table may be defined by a number of pivot points describing the piece-wise linear mapping of the chroma QP mapping table. For each pivot point, an input and an output QP may be signalled. For example, as shown below in the Implementation Examples, the input QP value for a pivot point may be defined by delta_qp_in_val[i][j], which specifies a delta value used to derive the input coordinate of the j-th pivot point of the i-th chroma QP mapping table. The output QP value for a pivot point may be defined by delta_qp_out_val[i][j], which specifies a delta value used to derive the output coordinate of the j-th pivot point of the i-th chroma QP mapping table. The particular chroma QP mapping table to be used for a particular residual may be specified by an index to the list of chroma QP mapping tables.

In other examples, for each residual type (e.g., Cb, Cr, joint CbCr), video encoder 200 may be configured to signal an index to specify the chroma QP mapping table that is to be used.

In any combination of the examples above, video encoder 200 may be configured to signal one or more chroma QP mapping tables in one or more parameter sets, in a slice header, or in other parts of the encoded video bitstream. Example parameter sets include one or more of an SPS, PPS, APS, VPS, decoder parameter set (DPS), or another parameter set. When associated with a parameter set, the chroma QP mapping table is applicable to all the samples in the picture that are associated with the particular parameter set.

In another example of the disclosure, video encoder 200 may specify one or more spatial regions for a picture (e.g., slice, tile, brick, region of interest, etc.) and video encoder 200 may signal one or more chroma QP mapping tables for a particular specified spatial region.

In other examples, video encoder 200 may be configured to update and signal the chroma QP mapping tables at the bitstream, sequence, frame, block or pixel level.

In examples where chroma QP mapping tables are associated with spatial regions, video encoder 200 may signal one or more chroma QP mapping tables and video encoder 200 may specify the particular chroma QP mapping table to be used for a particular region using an index to the list of chroma QP mapping tables.

In other examples of the disclosure, video encoder 200 may be configured to specify and signal chroma QP mapping tables for other chroma types, such as chroma formats, chroma sample location type, etc. A chroma format (e.g., chroma_format) may indicate the chroma sub-sampling format. Examples include monochrome, 4:4:0, 4:2:2, 4:4:4, etc. Chroma sample location type (e.g., chroma_sample_location_type) may indicate the relative location of luma and chroma samples for various chroma formats. Such chroma QP mapping tables may either be explicitly defined in a standard and stored at both video encoder 200 and video decoder 300, or signalled in the bitstream by means disclosed in this disclosure or other methods.

In another example of the disclosure, video encoder 200 may signal one or more syntax elements to indicate the chroma type to which the chroma QP mapping table is associated. In some instances, more than one syntax element may be used to indicate the chroma types with which the mapping table is associated. For example, video encoder 200 may signal a chroma QP mapping table for a chroma_format, chroma_sample_location_type, component id (Cb, Cr), etc.

In some examples, video encoder 200 and video decoder 300 may be configured to store one or more chroma QP mapping tables as a set. Video encoder 200 and video decoder 300 may further be configured to update, add, or remove one or more chroma QP mapping tables in the set resulting in a dynamic set of chroma QP mapping tables. The process for adding, updating, and/or removing the chroma QP mapping tables may be specified by respective syntax elements and/or or syntax element values. From the set of chroma QP mapping tables, video decoder 300 may derive a subset of the chroma QP mapping tables that are associated with the current block/sample/region into a mapping table list for the block/sample/region. Video encoder 200 may signal the particular mapping table to be used.

In some examples, one or more syntax elements in the SPS and/or video usability information (VUI) syntax may be used to infer the chroma type for which a chroma QP mapping table is applied.

In some examples, video encoder 200 and video decoder 300 may use different color spaces to code the video data (e.g., non-constant luminance Y'CbCr, constant luminance Y'CbCr, ICtCp, RGb, etc.). In such examples, video encoder 200 may specify one or more chroma QP mapping tables for deriving the QP value for the particular color component, which may or may not be dependent on the QP value of another color component. One or more methods described in this disclosure may be applicable for such color spaces and the methods and descriptions may be extended accordingly to such applications.

One or more video coding processes of video encoder 200 and video decoder 300 that uses a chroma QP may have an associated chroma QP mapping table. For example, video encoder 200 and video decoder 300 may determine various deblocking parameters/decisions using a chroma QP that may be calculated from a chroma QP mapping table. In some examples, video encoder 200 may signal an additional indication (e.g., syntax element) that associates a chroma QP mapping table to another video coding process (e.g., deblocking).

In some examples, one or more chroma deblocking filtering decisions or filter strengths (strong filter, weak filter, etc.) may be dependent on one or more signalled chroma QP mapping tables. These tables may apply to one component (Cb or Cr of joint CbCr) or more than one component. Video encoder 200 may signal syntax elements to associate deblocking decisions/filter strengths with a chroma QP mapping table, or such association may be inferred/derived by pre-determined methods.

In other examples of the disclosure, video encoder 200 and video decoder 300 may be configured to apply separate chroma QP mapping tables to high dynamic range (HDR) and standard dynamic range (SDR) video sequences. In some examples, video encoder 200 may signal an additional indication (e.g., syntax element) that associates a chroma QP mapping table to a type of video content (e.g., HDR content, SDR content, color gamut of the video content, color primaries of the video content, etc.).

One or more methods described in this disclosure may also be dependent on other syntax elements signalled in the bitstream, such as QP offset values associated with the color components in the slice header, PPS, and other parts of the bitstream. One or more video coding decisions may use the chroma QP mapping tables in conjunction with one or more syntax elements. For example, deblocking filter decisions may be based on the chroma QP mapping table and one or more QP offsets associated with one or more color components.

One or more methods disclosed in this document may further be constrained by one or more characteristics of the samples on which the chroma QP mapping table is applied For example, block shape, aspect ratio, prediction mode used, characteristics of the neighboring block, and location of the samples with respect to the picture (near the boundaries or away from the boundaries, including picture boundaries, tile boundaries, slice boundaries, brick boundaries, etc.) may be used to determine how and when chroma QP mapping tables are applied.

Some methods described above may be applied at video encoder 200, at video decoder 300, or both. Although many of the methods disclosed are for chroma components, the techniques of this disclosure may also be applicable for luma and for components in other colour spaces that may be used to represent the video data.

Video encoder 200 and video decoder 300 previously described relate to block-based coding techniques comprising encoding or decoding luma blocks and associated chroma blocks that are produced by a process of prediction, residual derivation and transform. The implementation examples below explain various techniques for determining quantization parameter values for use in such block-based video coding techniques, whether HEVC or VVC or other block-based video coding techniques.

Implementation Example 1

In some examples, the signalling of the chroma QP dependencies, including chroma QP mapping tables, can be signalled in an APS. Below is a non-limiting example of such a communication in an APS Raw Byte Sequence Payload (RBSP) syntax.

| APS RBSP syntax | |
|---|---|
| | Descriptor |
| adaptation_parameter_set_rbsp( ) { | |
|   adaptation_parameter_set_id | u(5) |
|   adaptation_parameter_set_type | u(5) |
|   chromaQP_table_data( ) | |
|   aps_extension_flag | u(1) |
|   if( aps_extension_flag ) | |
|     while( more_rbsp_data( ) ) | |
|       aps_extension_data_flag | u(1) |
|   rbsp_trailing_bits( ) | |
| } | |

| ChromaQP table data syntax | |
| --- | --- |
| | Descriptor |
| chromaQP_table_data( ) { <br> ... <br>    chroma_qp_table_present_flag <br>    if( chroma_qp_table_present_flag ) <br>       same_qp_table_for_cb_cr <br>       for( i = 0; i < <br>       same_qp_table_for_cb_cr ? 1 : 2; i++ ) { <br>          num_points_in_qp_table[ i ] <br>          for( j = 0; j < <br>          num_points_in_qp_table[ i ]; j++ ) <br>             delta_qp_in_val[ i ][ j ] <br>             delta_qp_out_val[ i ][ j ] <br>          } <br>       } <br> } | <br><br><br>u(1)<br><br>u(1)<br><br><br>ue(v)<br><br><br>ue(v)<br>ue(v) |

| Tile group header syntax: | |
| --- | --- |
| | Descriptor |
| tile_group_header( ) { <br>    tile_group_pic_parameter_set_id <br>    ... <br>    tile_group_type <br>    if( sps_chromaQP_table_flag) { <br>       adaptation_parameter_set_id <br>    } <br> } | <br>ue(v)<br><br>ue(v)<br><br>u(5) |

Semantics chroma_qp_table_present_flag equal to 1 specifies that chroma QP mapping table are signalled in the APS. chroma_qp_table_present_flag equal to 0 specifies that the chroma QP mapping table is not signalled in the APS and that Table 8-15 is used for deriving the chroma QP values.

same_qp_table_for_cb_cr equal to 1 specifies that only one chroma QP mapping table is signalled and applies to both Cb and Cr components. same_qp_table_for_cb_cr equal to 0 specifies that two chroma QP mapping tables are signalled in the APS.

num_points_in_qp_table_minus2[i] plus 2 specifies the number of points used to describe the chroma QP mapping table. The value of num_points_in_qp_table_minus1[i] shall be in the range of 0 to 69+QpBdOffset$_C$, inclusive.

delta_qp_in_val[i][j] specifies a delta value used to derive the input coordinate of the j-th pivot point of the i-th chroma QP mapping table.

delta_qp_out_val[i][j] plus specifies a delta value used to derive the output coordinate of the j-th pivot point of the i-th chroma QP mapping table.

The pivot points for each chroma QP table are indicated by qpVal[ ] and cQPTable[ ]. qpVal[j] and cQPTable[j] specifies the two coordinates of the j-th pivot point in chroma QP Table. Video encoder 200 and video decoder 300 derive the variable qpVal[ ] and cQPTable[ ] from delta_qp_in_val[ ][ ] and delta_qp_out_val[ ][ ], respectively. Video encoder 200 and video decoder 300 compute the value of the first pivot point by adding the values of syntax elements delta_qp_in_val[ ][ ] and delta_qp_out_val[ ][ ] to -QpBdOffset$_C$, which is the lowest QP value allowed for a particular bitdepth. The value of QpBdOffset$_C$ is equal to 6*(bitDepth$_C$−8), where bitDepth$_C$ is the bitdepth of the corresponding chroma component. For bitdepth beyond 8-bits, the QP value range is larger and depends on the bitdepth. For example, the QP value range may be set equal to -QpBdOffset$_C$ to 69, inclusive, where the value of QPBdOffset increases with bitdepth.

If the first pivot point does not correspond −QpBdOffset, then video encoder 200 and video decoder 300 may perform padding with a uniform slope of 1. For example, if QpBdOffset is equal to 12, qpVal[0]=4, and cQPTable[0]=4, then the value of ChromaQpTable[i][k] for in the range of −12 to 3, is set equal to −12 to 3, respectively. Similarly, if the last pivot point does not correspond to the value of the maximum QP (i.e., 69 in this example), video encoder 200 and video decoder 300 pad the QP value beyond the last pivot point by a slope 1 function. For all the intermediate QPs, for a QP value between pivot points, video encoder 200 and video decoder 300 derive the QP values by a linear interpolation between the adjoining pivot point pairs. For example, if there are two pivot points x1=qpVal[j], x2=qpVal[j+1], y1=cQpTable[j], y2=cQPTable[j+1], then for value of x between x1 and x2, video encoder 200 and video decoder 300 obtain the value of chroma mapping table ChromaQpTable[i][x] by linear interpolation between the two pivot points (x1, y1) and (x2, y2). In one or more places, video encoder 200 and video decoder 300 may clip the derived chroma QP value to the valid QP range (in this example, -QpBdOffset$_C$ to 69).

In general, video decoder 300 may be configured to pad QP values to the chroma QP mapping table from a lowest value pivot point of the set of pivot points to a minimum QP value using a slope of 1 function, and pad QP values to the chroma QP mapping table from a largest value pivot point of the set of pivot points to a maximum QP value using a slope of 1 function.

The i-th chroma QP mapping tables cQPTable[i] for i=0 . . . same_qp_table_for_cb_cr? 0:1 are derived as follows:

```
qpVal[ 0 ] = −QpBdOffset_C + delta_qp_in_val[ i ][ 0 ]
cQPTable[ i ][ 0 ] = −QpBdOffset_C + delta_qp_out_val[ i ][ 0 ]
for( j = 1;j < num_points_in_qp_table[ i ]; j++) {
    qpVal[ i ][ j ] = qpVal[i][ j − 1 ] + delta_qp_in_val[ i ][ j ]
    cQPTable[ i ][ j ] = cQPTable[i][ j − 1 ] + delta_qp_out_val[ i ][ j ]
}
if( qpVal[ 0 ] > −QpBdOffset_C) {
    ChromaQpTable[ i ][ qpVal[ 0 ] ] = cQPTable[ i ][ 0 ]
    for( k = qpVal[ 0 ] − 1; k >= −QpBdOffset_C; k − −)
        ChromaQpTable[ i ][ k ] = Clip3( −QpBdOffset_C, 69,
ChromaQpTable[ i ][ k + 1 ] − 1 )
}
for( j = 0 ; j < num_points_in_qp_table[ i ]; j++) {
    for( k = cQpTable[ j ] + 1, m = 1; k <= cQPTable[ j + 1]; k++, m++)
        sh = delta_qp_in_val [j + 1] >> 1
        ChromaQpTable[ i ][ k ] = ChromaQpTable[ i ][ cQpTable[ j ] ] +
        ( delta_qp_out_val[j + 1] * m + sh ) /
```

```
delta_qp_in_val [j + 1]
if( qpVal[ num_points_in_qp_table[ i ] − 1 ] != 69)
    for( k = qpVal[ num_points_in_qp_table[ i ] − 1 ] + 1; k <= 69; k++)
        ChromaQpTable[ i ][ k ] = Clip3( −QpBdOffset$_C$, 69,
ChromaQpTable[ i ][ k − 1] + 1 )
```

When same_qp_table_for_cb_cr is equal to 1, ChromaQpTable[1][k] is set equal to ChromaQpTable[0][k] for k=−QpBdOffset$_C$ . . . 69.

Further, the following changes are made to the chroma QP derivation.

The following constraint may be added: The value of qpVal[i][j] shall be greater than the value qpVal[i][j−1] for j=1 . . . num_points_in_qp_table[i].

The following text is removed from VVC Draft 5:

If ChromaArrayType is equal to 1, the variables qP$_{Cb}$, qP$_{Cr}$ and qP$_{CbCr}$ are set equal to the value of Qpc as specified in Table 8-15 based on the index qPi equal to qPi$_{Cb}$, qPi$_{Cr}$ and qPi$_{CbCr}$, respectively.

Otherwise, the variables qP$_{Cb}$, qP$_{Cr}$ and qP$_{CbCr}$ are set equal to Min(qPi, 63), based on the index qPi equal to qPi$_{Cb}$, qPi$_{Cr}$ and qPi$_{CbCr}$, respectively.

The following text is added to VVC Draft 5

If ChromaArrayType is equal to 1, the following applies:

If chroma_qp_table_present_flag is equal to 1, the variables qP$_{Cb}$ and qP$_{Cr}$ are set equal to the ChromaQpTable[0][qPi$_{Cb}$] and ChromaQpTable[1][qPi$_{Cr}$], respectively.

Otherwise (chroma_qp_table_present_flag is equal to 0), the variables qP$_{Cb}$ and qP$_{Cr}$ are set equal to the value of Qpc as specified in Table 8-15 based on the index qPi equal to qPi$_{Cb}$ and qPi$_{Cr}$, respectively.

The variable qP$_{CbCr}$ is set equal to the value of Qpc as specified in Table 8-15 based on the index qPi equal to qPi$_{CbCr}$.

In some examples, the signalling of the chroma QP mapping tables may also be present in other parameter sets (e.g., SPS, PPS, etc.) or in the slice header/data syntax structures.

One or more delta values of the QPs (delta_qp_in_Val, delta_qp_out_val) may be signalled with a minus1 (e.g., after subtracting a value of 1) to indicated that some syntax elements may not be allowed to take the zero value. For example, some delta values may be disallowed to take the value 0, and signalling the syntax element with a "minus1" is more efficient. More generally, the syntax elements may be signalled with a "minusN", where N may be pre-determined/signalled.

The number of pivot points in the chroma QP mapping table may be constrained to be equal to at least a threshold T. In such cases, the endpoint may be inferred, and the syntax element num_points_in_qp_table may be signalled with a minusT (e.g., after subtracting T from the value).

Implementation Example 2

In another example of the disclosure, an alternate form of signalling the chroma QP mapping tables is provided. In this example, the signalling of the chroma QP dependencies, including chroma QP mapping tables, are signaled in an SPS. Below is a non-limiting example of such a communication in an SPS.

| Syntax | Descriptor |
|---|---|
| sequence_parameter_set( ) { | |
| ... | |
|   chroma_qp_table_present_flag | u(1) 1 |
|   if( chroma_qp_table_present_flag ) | |
|     same_qp_table_for_chroma | u(1) 1 |
|     global_offset_flag | u(1) 1 |
|     for( i = 0; i < | |
|     same_qp_table_for_chroma ? 1 : 2; i++ ) { | |
|       num_points_in_qp_table[ i ] | ue(v) |
|       for( j = 0; j < | |
|       num_points_in_qp_table[ i ]; j++ ) | |
|         delta_qp_in_val_minus1[ i ][ j ] | u(6) |
|         delta_qp_out_val[ i ][ j ] | se(v) |
|       } | |
|     } | |
|   } | |
| } | | chroma_qp_table_present_flag equal to 1 specifies that chroma QP mapping tables are signalled in the SPS. chroma_qp_table_present_flag equal to 0 specifies that the chroma QP mapping tables are not signalled in the SPS and that Table 8-16 is used for deriving the chroma QP values.

same_qp_table_for_chroma equal to 1 specifies that only one chroma QP mapping table is signalled and applies to both Cb and Cr components. same_qp_table_for_chroma equal to 0 specifies that two chroma QP mapping tables for Cb and Cr respectively are signalled in the SPS.

global_offset_flag equal to 1 specifies that the first pivot point in the chroma QP mapping tables has an input coordinate of at least 16 and output coordinate of at least 16. global_offset_flag equal to 0 specifies that there are no restrictions on the first pivot point in the chroma QP mapping tables.

num_points_in_qp_table_minus1[i] plus 1 specifies the number of points used to describe the chroma QP mapping table. The value of num_points_in_qp_table_minus1[i] shall be in the range of 0 to 57+QpBdOffset$_C$−(global_offset_flag==1? 16:0), inclusive.

delta_qp_in_val_minus1[i][j] plus 1 specifies a delta value used to derive the input coordinate of the j-th pivot point of the i-th chroma QP mapping table.

delta_qp_out_val[i][j] specifies a delta value used to derive the output coordinate of the j-th pivot point of the i-th chroma QP mapping table.

The i-th chroma QP mapping tables ChromaQpTable[i] for i=0 . . . same_qp_table_for_chroma? 0:1 are derived as follows:

```
startQp = ( global offset flag = = 1 ) ? 16 : -QpBdOffset_C
qpInVal[ i ][ 0 ] = startQP + delta_qp_in_val_minus1[ i ][ 0 ]
qpOutVal[ i ][ 0 ] = startQP + delta_qp_in_val_minus1[ i ][ 0 ] +
delta_qp_out_val[ i ][ 0 ]
for( j = 1;j <= num_points_in_qp_table_minus1[ i ]; j++) {
    qpInVal[ i ][ j ] = qpInVal[ i ][ j - 1 ] + delta_qp_in_val_minus1[ i ][ j ] + 1
    qpOutVal[ i ][ j ] = qpOutVal[ i ][ j - 1 ] + ( delta_qp_in_val_minus1[ i ][ j ] + 1
-
    delta_qp_out_val[ i ][ j ]
}
ChromaQpTable[ i ][ qpInVal[ i ][ 0 ] ] = qpOutVal[ i ][ 0 ]
for( k = qpInVal[ i ][ 0 ] - 1; k >= -QpBdOffset_C; k - - )
    ChromaQpTable[ i ][ k ] = Clip3( -QpBdOffset_C, 57,
ChromaQpTable[ i ][ k +1 ] - 1 )
for( j = 0 ; j < num_points_in_qp_table_minus1[ i ]; j++) {
    sh = ( delta_qp_in_val_minus1[ i ][j + 1 ] + 1 ) >>1
    for( k = qpInVal[ i ][ j ] + 1, m = 1; k <= qpInval[ i ][ j + 1 ]; k++, m++)
        ChromaQpTable[ i ][ k ] = ChromaQpTable[ i ][ qpInVal[ i ][ j ] ] +
            ( delta_qp_out_val[ i ][j + 1] * m + sh )/
( delta_qp_in_val_minus1[ i ][j + 1] +1 )
}
for( k = qpInVal[ i ][ num_points_in_qp_table_minus1[ i ] ] + 1; k <= 57; k++)
    ChromaQpTable[ i ][ k ] = Clip3( -QpBdOffset_C, 57,
ChromaQpTable[ i ][ k - 1 ] + 1)
```

When same_qp_table_for_chroma is equal to 1, ChromaQpTable[1][k] is set equal to ChromaQpTable[0][k] for k=-QpBdOffset_C . . . 57.

It is a requirement of bitstream conformance that the values of qpInVal[i][j] and qpOutval[i][j] shall be in the range of -QpBdOffset_C to 57, inclusive, for
i=0 . . . same_qp_table_for_chroma? 0:1 and
j=0 . . . num_points_in_qp_table minus1[i].

Table 1 provides bit estimates for examples of some chroma QP mapping tables defined for usage in MPEG Essential Video Coding (EVC) and WET developments.

TABLE 1

Analysis of bits* required to signal examples of Chroma QP mapping tables

| Bits | MPEG5 EVC Table 8-16 | VTM AI | VTM RA/LD | VTM ClassH/HDR |
|---|---|---|---|---|
| Pivot points (input) | [30, 39, 43] | [1, 31, 43] | [32, 44] | [9, 23, 33, 42] |
| Pivot points (output) | [29, 37, 40] | [1, 32, 41] | [32, 41] | [9, 24, 33, 37] |
| delta_qp_in_val_minus1* | [14, 8, 3] | [1, 29, 11] | [32, 11] | [9, 13, 9, 8] |
| delta_qp_out_val (signalled) | [0, 1, 1, 1] | [0, 1, -3] | [0, -3] | [0, 1, -1, -5] |
| #bits (delta_qp_in_val_minus1) | [6, 6, 6] | [6, 6, 6] | [6, 6] | [6, 6, 6, 6] |
| # bits (delta_qp_out_val) | [3, 3, 3] | [1, 3, 5] | [1, 5] | [1, 3, 3, 7] |
| # bits for global_offset_flag | 1 | 1 | 1 | 1 |
| Total bits | 25 | 28 | 19 | 39 |

*The number of bits here applies to the signalling of delta_qp_in_val_minus1 and delta_qp_out_val. The other syntax elements associated with chroma QP mapping tables are similar in all methods discussed in this disclosure and hence were not measured.

Figure 4:
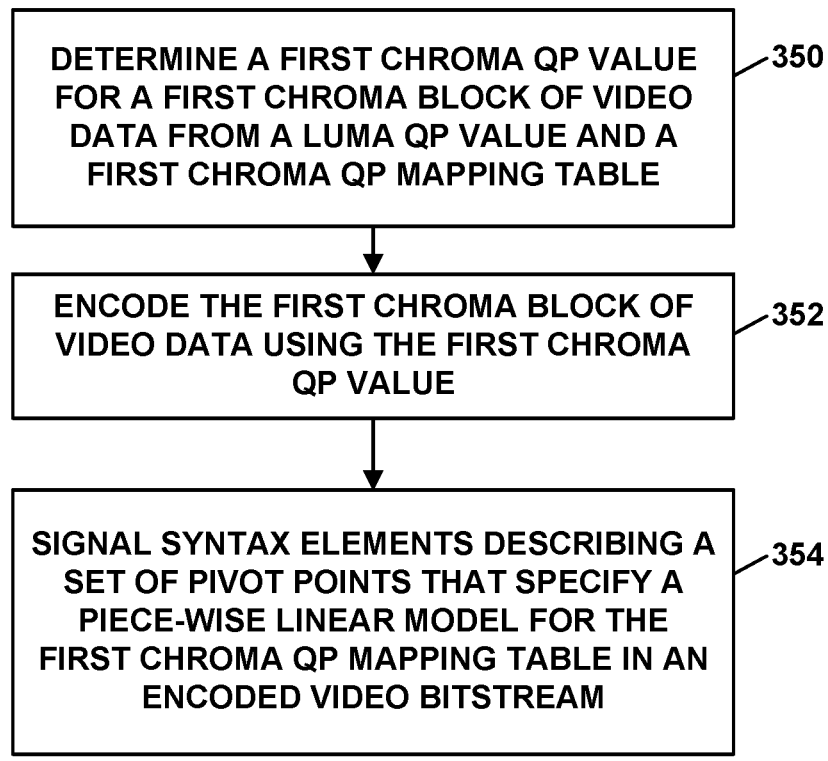
FIG. 4 is a flowchart illustrating an example video encoding method of the disclosure.

FIG. 4 is a flowchart illustrating an example method for encoding a current block according to the techniques of this disclosure. The current block may comprise a current chroma block. Although described with respect to video encoder 200 (FIGS. 1 and 2), it should be understood that other devices may be configured to perform a method similar to that of FIG. 4.

In one example of the disclosure, video encoder 200 may be configured to determine a first chroma QP value for a first chroma block of video data from a luma QP value and a first chroma QP mapping table (350), and may encode the first chroma block of video data using the first chroma QP value (352). Video encoder 200 may be further configured to determine the luma QP value, and encode a luma block of video data corresponding to the first chroma block of video data using the luma QP value. Video encoder 200 may also be configured to signal syntax elements (e.g., delta_qp_in_val[ ][ ] and delta_qp_out_val[ ][ ]) describing a set of pivot points that specify a piece-wise linear model for the first chroma QP mapping table in an encoded video bitstream (354).

In another example of the disclosure, the first chroma block is a Cb chroma block and a second chroma block is a co-located Cr chroma block. In this example, video encoder 200 may be further configured to signal a syntax element that indicates if a same chroma QP mapping table is used for both the Cb chroma block and the Cr chroma block.

In one example, the same chroma QP mapping table is used for both the Cb chroma block and the Cr chroma block. In this example, video encoder 200 is further configured to determine a second chroma QP value for the Cr chroma block of video data from the luma QP value and the first chroma QP mapping table. In another example, the same chroma QP mapping table is not used for both the Cb chroma block and the Cr chroma block. In this example, video encoder 200 is configured to determine a second chroma QP value for the Cr chroma block of video data from the luma QP value and a second chroma QP mapping table, and signal the second chroma QP mapping table in the encoded video bitstream for the Cr chroma block.

In one example, the same chroma QP mapping table is used for both the Cb chroma block, Cr chroma block, and the joint CbCr chroma blocks. In this example, video encoder 200 is further configured to determine a second chroma QP value for the Cr chroma block of video data from the luma QP value and the first chroma QP mapping table, and a third chroma QP value for the joint CbCr chroma block of video data from the luma QP and the first chroma QP mapping table. In another example, the same chroma QP mapping table may not be used for the Cb chroma block, the Cr chroma block, and the joint CbCr chroma block. In this example, video encoder 200 is configured to determine a second chroma QP value for the Cb chroma block of video data from the luma QP value and a second chroma QP mapping table, and signal the second chroma QP mapping table in the encoded video bitstream for the Cb chroma block. The video encoder 200 is configured to determine a third chroma QP value for the Cr chroma block of video data from the luma QP value and a third chroma QP mapping table, and signal the third chroma QP mapping table in the encoded video bitstream for the Cr chroma block.

In another example, the same chroma QP mapping table is not used for each of the Cb chroma block, the Cr chroma block and a joint CbCr residual. In this example, video encoder 200 may be configured to signal a second chroma QP mapping table in the encoded video bitstream for the Cr chroma block, and signal a third chroma QP mapping table in the encoded video bitstream for the joint CbCr residual.

In another example, of the disclosure, the first chroma block of video data is a joint CbCr residual.

In another example of the disclosure, video encoder 200 is configured to signal the chroma QP mapping tables in a sequence parameter set (SPS).

In another example of the disclosure, video encoder 200 is configured to signal a syntax element that indicates whether one or more chroma mapping tables are signaled explicitly in the encoded video bitstream.

Figure 5:
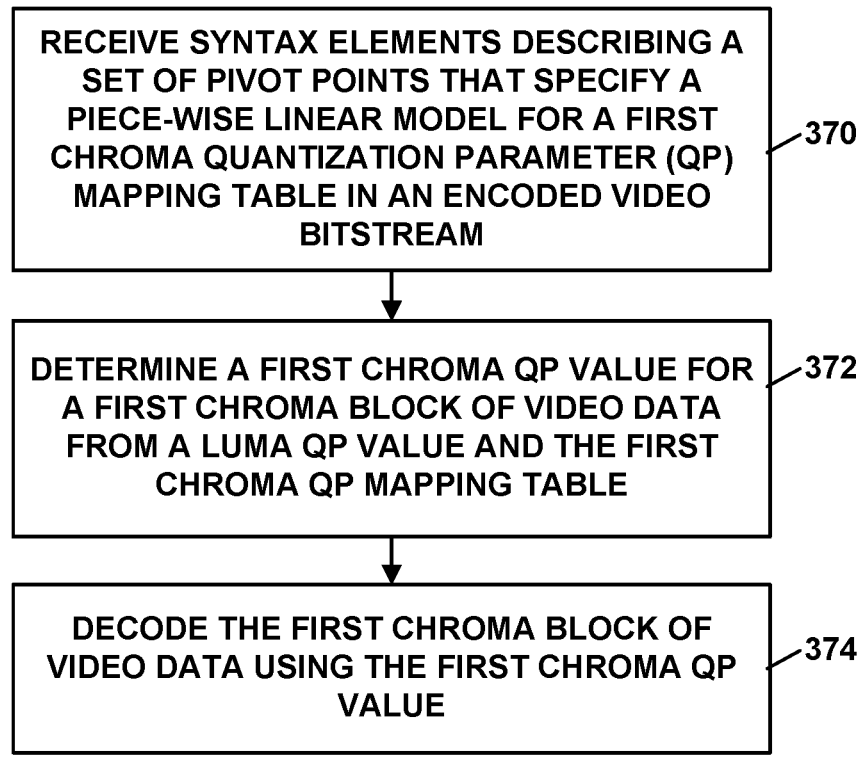
FIG. 5 is a flowchart illustrating an example video decoding method of the disclosure.

FIG. 5 is a flowchart illustrating an example method for decoding a current block of video data according to the techniques of this disclosure. The current block may comprise a current chroma block. Although described with respect to video decoder 300 (FIGS. 1 and 3), it should be understood that other devices may be configured to perform a method similar to that of FIG. 5.

In one example of the disclosure, video decoder 300 may be configured to receive syntax elements (e.g., delta_qp_in_val[ ][ ] and delta_qp_out_val[ ][ ]) describing a set of pivot points that specify a piece-wise linear model for a first chroma quantization parameter (QP) mapping table in an encoded video bitstream (370). Video decoder 300 may be configured to determine a first chroma QP value for a first chroma block of video data from a luma QP value and the first chroma QP mapping table (372), and decode the first chroma block of video data using the first chroma QP value (374). Video decoder 300 may be further configured to determine the luma QP value, and decode a luma block of video data corresponding to the first chroma block of video data using the luma QP value.

In one example of the disclosure, video decoder 300 may be configured to pad QP values to the first chroma QP mapping table from a lowest value pivot point of the set of pivot points to a minimum QP value using a slope of 1 function, and pad QP values to the first chroma QP mapping table from a largest value pivot point of the set of pivot points to a maximum QP value using a slope of 1 function.

In one example of the disclosure, the first chroma block is a Cb chroma block and a second chroma block is a co-located Cr chroma block. In this example, video decoder 300 may be further configured to receive a syntax element that indicates if a same chroma QP mapping table is used for both the Cb chroma block and the Cr chroma block.

In one example, the syntax element indicates that the same chroma QP mapping table is used for both the Cb chroma block and the Cr chroma block. In this example, video decoder 300 may be further configured to determine a second chroma QP value for the Cr chroma block of video data from the luma QP value and the first chroma QP mapping table. In another example, the syntax element indicates that the same chroma QP mapping table is not used for both the Cb chroma block and the Cr chroma block. In this example, video decoder 300 may be further configured to receive a second chroma QP mapping table in the encoded video bitstream for the Cb chroma block, and determine a second chroma QP value for the Cb chroma block of video data from the luma QP value and the second chroma QP mapping table.

In another example, the syntax element indicates that the same chroma QP mapping table is not used for each of the Cb chroma block, the Cr chroma block and a joint CbCr residual. In this example, video decoder 300 may be configured to receive a second chroma QP mapping table in the encoded video bitstream for the Cr chroma block, and receive a third chroma QP mapping table in the encoded video bitstream for the joint CbCr residual.

In another example, the first chroma block of video data is a joint CbCr residual.

In another example, video decoder 300 may be configured to receive the chroma QP mapping tables in a sequence parameter set (SPS).

In another example, video decoder 300 may be configured to receive a syntax element that indicates whether one or more chroma mapping tables are signaled explicitly in the encoded video bitstream.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
  receiving syntax elements describing a set of pivot points that specify a piece-wise linear model for a first chroma quantization parameter (QP) mapping table in an encoded video bitstream;
  determining a first chroma QP value for a first chroma block of video data from a luma QP value and the first chroma QP mapping table;
  receiving a syntax element that indicates if a same chroma QP mapping table is used for both a Cb chroma block and a co-located Cr chroma block, wherein the first chroma block is the Cb chroma block and a second chroma block is the co-located Cr chroma block; and
  decoding the first chroma block of video data using the first chroma QP value.

2. The method of claim 1, further comprising:
  padding QP values to the first chroma QP mapping table from a lowest value pivot point of the set of pivot points to a minimum QP value using a slope of 1 function; and
  padding QP values to the first chroma QP mapping table from a largest value pivot point of the set of pivot points to a maximum QP value using a slope of 1 function.

3. The method of claim 1, wherein the syntax element indicates that the same chroma QP mapping table is used for the Cb chroma block, the Cr chroma block, and a joint CbCr residual, the method further comprising:
  determining a second chroma QP value for the Cr chroma block of video data from the luma QP value and the first chroma QP mapping table.

4. The method of claim 1, wherein the syntax element indicates that the same chroma QP mapping table is not used for both the Cb chroma block and the Cr chroma block, the method further comprising:
  receiving a second chroma QP mapping table in the encoded video bitstream for the Cr chroma block; and
  determining a second chroma QP value for the Cr chroma block of video data from the luma QP value and the second chroma QP mapping table.

5. The method of claim 1, wherein the syntax element indicates that the same chroma QP mapping table is not used for each of the Cb chroma block, the Cr chroma block and a joint CbCr residual, the method further comprising:
  receiving a second chroma QP mapping table in the encoded video bitstream for the Cr chroma block; and
  receiving a third chroma QP mapping table in the encoded video bitstream for the joint CbCr residual.

6. The method of claim 1, further comprising:
  determining the luma QP value; and
  decoding a luma block of video data corresponding to the first chroma block of video data using the luma QP value.

7. The method of claim 1, wherein receiving the chroma QP mapping table comprises:
  receiving the chroma QP mapping table in a sequence parameter set (SPS).

8. The method of claim 1, further comprising:
  receiving a syntax element that indicates whether one or more chroma QP mapping tables are signaled explicitly in the encoded video bitstream.

9. The method of claim 1, further comprising:
  displaying a picture that includes the first chroma block of video data.

10. An apparatus configured to decode video data, the apparatus comprising:
  a memory configured to store video data; and
  one or more processors in communication with the memory, the one or more processors configured to:
    receive syntax elements describing a set of pivot points that specify a piece-wise linear model for a first chroma quantization parameter (QP) mapping table in an encoded video bitstream;
    determine a first chroma QP value for a first chroma block of video data from a luma QP value and the first chroma QP mapping table
    receive a syntax element that indicates if a same chroma QP mapping table is used for both a Cb chroma block and a co-located Cr chroma block, wherein the first chroma block is the Cb chroma block and a second chroma block is the co-located Cr chroma block; and
decode the first chroma block of video data using the first chroma QP value.

11. The apparatus of claim 10, wherein the one or more processors are further configured to:
pad QP values to the first chroma QP mapping table from a lowest value pivot point of the set of pivot points to a minimum QP value using a slope of 1 function; and
pad QP values to the first chroma QP mapping table from a largest value pivot point of the set of pivot points to a maximum QP value using a slope of 1 function.

12. The apparatus of claim 10, wherein the syntax element indicates that the same chroma QP mapping table is used for the Cb chroma block, the Cr chroma block, a joint CbCr residual, and wherein the one or more processors are further configured to:
determine a second chroma QP value for the Cr chroma block of video data from the luma QP value and the first chroma QP mapping table.

13. The apparatus of claim 10, wherein the syntax element indicates that the same chroma QP mapping table is not used for both the Cb chroma block and the Cr chroma block, and wherein the one or more processors are further configured to:
receive a second chroma QP mapping table in the encoded video bitstream for the Cr chroma block; and
determine a second chroma QP value for the Cr chroma block of video data from the luma QP value and the second chroma QP mapping table.

14. The apparatus of claim 10, wherein the syntax element indicates that the same chroma QP mapping table is not used for each of the Cb chroma block, the Cr chroma block and a joint CbCr residual, wherein the one or more processors are further configured to:
receive a second chroma QP mapping table in the encoded video bitstream for the Cr chroma block; and
receive a third chroma QP mapping table in the encoded video bitstream for the joint CbCr residual.

15. The apparatus of claim 10, wherein the one or more processors are further configured to:
determine the luma QP value; and
decode a luma block of video data corresponding to the first chroma block of video data using the luma QP value.

16. The apparatus of claim 10, wherein to receive the chroma QP mapping table, the one or more processors are further configured to:
receive the chroma QP mapping table in a sequence parameter set (SPS).

17. The apparatus of claim 10, wherein the one or more processors are further configured to:
receive a syntax element that indicates whether one or more chroma QP mapping tables are signaled explicitly in the encoded video bitstream.

18. The apparatus of claim 10, further comprising:
a display configured to display a picture that includes the first chroma block of video data.

19. The apparatus of claim 10, wherein the apparatus is a wireless communication device.

20. A method of encoding video data, the method comprising:
determining a first chroma quantization parameter (QP) value for a first chroma block of video data from a luma QP value and a first chroma QP mapping table;
encoding the first chroma block of video data using the first chroma QP value;
signaling a syntax element that indicates if a same chroma QP mapping table is used for both a Cb chroma block and a co-located Cr chroma block, wherein the first chroma block is the Cb chroma block and a second chroma block is the co-located Cr chroma block; and
signaling syntax elements describing a set of pivot points that specify a piece-wise linear model for the first chroma QP mapping table in an encoded video bitstream.

21. An apparatus configured to encode video data, the apparatus comprising:
a memory configured to store video data; and
one or more processors in communication with the memory, the one or more processors configured to:
determine a first chroma quantization parameter (QP) value for a first chroma block of video data from a luma QP value and a first chroma QP mapping table;
encode the first chroma block of video data using the first chroma QP value;
signal a syntax element that indicates if a same chroma QP mapping table is used for both a Cb chroma block and a co-located Cr chroma block, wherein the first chroma block is the Cb chroma block and a second chroma block is the co-located Cr chroma block; and
signal syntax elements describing a set of pivot points that specify a piece-wise linear model for the first chroma QP mapping table in an encoded video bitstream.

22. The apparatus of claim 21, wherein the same chroma QP mapping table is used for the Cb chroma block, the Cr chroma block, and a joint CbCr residual, and wherein the one or more processors are further configured to:
determine a second chroma QP value for the Cr chroma block of video data from the luma QP value and the first chroma QP mapping table.

23. The apparatus of claim 21, wherein the same chroma QP mapping table is not used for both the Cb chroma block and the Cr chroma block, and wherein the one or more processors are further configured to:
determine a second chroma QP value for the Cr chroma block of video data from the luma QP value and a second chroma QP mapping table; and
signal the second chroma QP mapping table in the encoded video bitstream for the Cr chroma block.

24. The apparatus of claim 21, wherein the same chroma QP mapping table is not used for each of the Cb chroma block, the Cr chroma block and a joint CbCr residual, and wherein the one or more processors are further configured to:
signal a second chroma QP mapping table in the encoded video bitstream for the Cr chroma block; and
signal a third chroma QP mapping table in the encoded video bitstream for the joint CbCr residual.

25. The apparatus of claim 21, wherein the one or more processors are further configured to:
determine the luma QP value; and
encode a luma block of video data corresponding to the first chroma block of video data using the luma QP value.

26. The apparatus of claim 21, wherein to signal the chroma QP mapping table, the one or more processors are further configured to:
signal the chroma QP mapping tables table in a sequence parameter set (SPS).

27. The apparatus of claim 21, wherein the one or more processors are further configured to:
  signal a syntax element that indicates whether one or more chroma QP mapping tables are signaled explicitly in the encoded video bitstream.

28. The apparatus of claim 21, further comprising:
  a camera configured to capture a picture that includes the first chroma block of video data.

29. The apparatus of claim 21, wherein the apparatus is a wireless communication device.

30. An apparatus configured to decode video data, the apparatus comprising:
  a memory configured to store video data; and
  one or more processors in communication with the memory, the one or more processors configured to:
    receive syntax elements describing a set of pivot points that specify a piece-wise linear model for a first chroma quantization parameter (QP) mapping table in an encoded video bitstream;
    determine a first chroma QP value for a first chroma block of video data from a luma QP value and the first chroma QP mapping table, wherein the first chroma block of video data is a joint CbCr residual; and
    decode the first chroma block of video data using the first chroma QP value.

* * * * *